(12) United States Patent
Monmeyran et al.

(10) Patent No.: US 12,157,288 B2
(45) Date of Patent: Dec. 3, 2024

(54) LAMINATED GLAZING HAVING LOW LIGHT TRANSMISSION AND HIGH SELECTIVITY

(71) Applicant: SAINT-GOBAIN GLASS FRANCE, Courbevoie (FR)

(72) Inventors: Corentin Monmeyran, Paris (FR); Michele Schiavoni, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/764,401

(22) PCT Filed: Sep. 28, 2020

(86) PCT No.: PCT/EP2020/077089
§ 371 (c)(1),
(2) Date: Mar. 28, 2022

(87) PCT Pub. No.: WO2021/063879
PCT Pub. Date: Apr. 8, 2021

(65) Prior Publication Data
US 2022/0363036 A1    Nov. 17, 2022

(30) Foreign Application Priority Data
Sep. 30, 2019   (FR) ...................................... 1910832

(51) Int. Cl.
*B32B 15/04* (2006.01)
*B32B 17/06* (2006.01)
*B32B 17/10* (2006.01)

(52) U.S. Cl.
CPC .. *B32B 17/10201* (2013.01); *B32B 17/10036* (2013.01); *B32B 17/10229* (2013.01); *B32B 2307/204* (2013.01); *B32B 2307/412* (2013.01); *B32B 2311/08* (2013.01)

(58) Field of Classification Search
CPC .................. B32B 17/10036; B32B 17/10229
USPC ................................................ 428/426, 434
See application file for complete search history.

(56) References Cited

U.S. PATENT DOCUMENTS

| | | | |
|---|---|---|---|
| 6,910,729 B2 * | 6/2005 | Kraenzler | B32B 17/10036 296/146.15 |
| 7,659,002 B2 * | 2/2010 | Coster | B32B 17/10036 428/428 |
| 8,025,957 B2 * | 9/2011 | Thiel | C03C 17/36 359/360 |
| 8,137,814 B2 * | 3/2012 | Barton | C03C 17/3642 428/689 |
| 8,286,395 B2 * | 10/2012 | Mauvernay | C03C 17/3652 52/204.5 |
| 9,242,895 B2 * | 1/2016 | Disteldorf | C03C 17/3441 |
| 9,475,727 B2 * | 10/2016 | Imran | C03C 17/3435 |
| 9,650,291 B2 * | 5/2017 | Manz | B32B 17/10761 |
| 9,919,960 B2 * | 3/2018 | Mahieu | C03C 17/3626 |
| 10,017,416 B2 * | 7/2018 | Manz | B32B 15/08 |
| 10,947,154 B2 * | 3/2021 | Morin | C03C 17/3649 |
| 11,001,037 B2 * | 5/2021 | Hagen | B32B 17/10761 |
| 11,027,527 B2 * | 6/2021 | Biswas | C03C 17/3644 |
| 2004/0028953 A1 * | 2/2004 | Kraemling | B32B 27/36 428/697 |
| 2005/0123772 A1 * | 6/2005 | Coustet | C03C 17/3652 428/432 |
| 2006/0182980 A1 * | 8/2006 | Barton | B32B 17/10174 501/71 |
| 2007/0104965 A1 | 5/2007 | Labrousse et al. | |
| 2008/0121904 A1 * | 5/2008 | Suzuki | H01L 33/405 257/E33.068 |
| 2009/0098354 A1 * | 4/2009 | Torr | B32B 17/1011 428/215 |
| 2009/0197077 A1 | 8/2009 | Reutler et al. | |
| 2009/0320824 A1 * | 12/2009 | Henn | C03C 17/3435 204/192.15 |
| 2011/0262726 A1 * | 10/2011 | Knoll | C03C 17/36 428/428 |
| 2014/0022630 A1 | 1/2014 | Reymond et al. | |
| 2014/0087101 A1 * | 3/2014 | Tixhon | C03C 17/3417 428/34 |
| 2014/0377580 A1 * | 12/2014 | Manz | C03C 17/3652 428/457 |
| 2015/0255678 A1 * | 9/2015 | Boyama | H01L 33/007 438/46 |

(Continued)

FOREIGN PATENT DOCUMENTS

CN    1489556 A    4/2004
CN    101060977 A   10/2007
(Continued)

OTHER PUBLICATIONS

IInternational Search Report as issued in International Patent Application No. PCT/EP2020/077089, dated Nov. 2, 2020.
First Office Action as issued in Chinese Patent Application No. 202080082386.9, dated Dec. 16, 2022.
Third Party Observation as submitted in European Patent Application No. 20200775678, dated Jun. 20, 2023.

*Primary Examiner* — Lauren R Colgan
(74) *Attorney, Agent, or Firm* — Pillsbury Winthrop Shaw Pittman LLP

(57) ABSTRACT

A laminated glazing includes two transparent substrates which are separated by a lamination interlayer, and intended for fitting out buildings or vehicles. One of the transparent substrates is coated with a functional coating capable of acting on solar radiation and/or infrared radiation, and a low emissivity (so-called "low E") coating is provided on one of the faces of the second substrate.

15 Claims, No Drawings

(56) References Cited

U.S. PATENT DOCUMENTS

| | | | |
|---|---|---|---|
| 2016/0002099 A1* | 1/2016 | Manz | B32B 17/10036 |
| | | | 427/160 |
| 2016/0023942 A1 | 1/2016 | Mahieu | |
| 2018/0141314 A1 | 5/2018 | Reutler et al. | |
| 2020/0055285 A1* | 2/2020 | Compoint | B32B 17/10036 |
| 2020/0384739 A1* | 12/2020 | Hagen | B32B 17/10495 |

FOREIGN PATENT DOCUMENTS

| | | |
|---|---|---|
| CN | 102918433 A | 2/2013 |
| CN | 103073196 A | 5/2013 |
| CN | 104995151 A | 10/2015 |
| EP | 1 060 876 A2 | 12/2000 |
| WO | WO 02/48065 A1 | 6/2002 |
| WO | WO 2005/007592 A2 | 1/2005 |
| WO | WO 2006/108980 A2 | 10/2006 |
| WO | WO 2018/178547 A1 | 10/2018 |
| WO | WO 2019/097192 A1 | 5/2019 |
| WO | WO 2019/110172 A1 | 6/2019 |

\* cited by examiner

LAMINATED GLAZING HAVING LOW LIGHT TRANSMISSION AND HIGH SELECTIVITY

CROSS-REFERENCE TO RELATED APPLICATIONS

This application is the U.S. National Stage of PCT/EP2020/077089, filed Sep. 28, 2020, which in turn claims priority to French patent application number 1910832 filed Sep. 30, 2019. The content of these applications are incorporated herein by reference in their entireties.

The invention relates to laminated glazings comprising two transparent substrates which are separated by a lamination interlayer, and intended for fitting out buildings or vehicles. One of the transparent substrates is coated with a functional coating capable of acting on solar radiation and/or infrared radiation, and a low emissivity (so-called low E) coating is provided on one of the faces of the second substrate.

Laminated glazings are widely used in vehicles and buildings. They are known for avoiding risks of injuries in the event they are broken. Moreover, they should allow a sufficient amount of light to pass while not allowing all of the incident solar radiation to pass in order not to excessively heat the interior of the vehicle or building. Respect for these two requirements constitutes a compromise. Therefore, there is always a demand for laminated glazings with increased selectivity in terms of transparency to light relative to transparency to energy.

These glazings are intended both to:
reduce climate control effort and/or prevent excessive heating, glazings called "solar control," as well as to:
reduce the amount of energy dissipated to the exterior, glazings called "low emissive."

In the following description, the term "functional" as used in "functional coating" means "able to act on solar radiation and/or infrared radiation."

Depending on the climates of the countries in which these glazings are installed, particularly depending on the amount of sunshine, the desired performance properties in terms of light transmission and solar factor may vary. Consequently, different ranges of glazings characterized by their level of light transmission are developed.

For example, in countries with high levels of sunshine, there is a great demand for glazings having a light transmission of the order of 25 to 45% and sufficiently low solar factor values.

The selectivity "S" enables the performance of these glazings to be evaluated. It corresponds to the ratio of light transmission $TL_{vis}$ in the visible range of the glazing to the solar factor FS of the glazing ($S=TL_{vis}/FS$). Solar factor "FS or g" is understood to mean the ratio in % of the total energy entering the premises through the glazing to the incident solar energy.

Obtaining a high selectivity must not be done to the detriment of the aesthetic appearance and in particular of the color. In general, it is desired to obtain as neutral an appearance as possible in external and internal reflection, as well as in transmission.

The conventional approach to obtain both high selectivity and excellent color neutrality consists in developing increasingly sophisticated functional coatings.

Known selective glazings comprise transparent substrates coated with a functional coating comprising a stack of several metallic functional layers, each arranged between two dielectric coatings. These functional coatings are generally obtained by a sequence of depositions carried out by cathode sputtering, optionally assisted by a magnetic field.

Conventionally, the faces of a glazing are designated starting from the exterior of the building and by numbering the faces of the substrates from the outside towards the inside of the passenger compartment or of the premises which it equips. This means that the incident sunlight passes through the faces in increasing numerical order.

Adapting the colorimetry of these glazings is achieved by adjusting the nature, the thicknesses of the layers or coatings forming the functional coatings.

The complexity of the functional coatings makes it difficult to obtain both good thermal performance and excellent color neutrality.

Finally, the complexity of these functional coatings also makes it difficult to maintain a constant production quality for a given functional coating. Indeed, by multiplying the number of layers and materials forming these functional coatings, it is increasingly difficult to adapt the settings of the deposition conditions in order to obtain functional coatings of identical color originating from two batches produced on the same production site or of two batches produced on two different production sites.

In the case of a laminated glazing, all the faces of the transparent substrates are numbered but the faces of the laminating interlayers are not numbered. Face 1 is outside the building and thus constitutes the exterior wall of the glazing, face 4 is inside the building and thus constitutes the interior wall of the glazing, and faces 2 and 3 are in contact with the lamination interlayer.

Compared to double glazings, it is more difficult to obtain good selectivity with laminated glazings. First, they do not benefit from thermal insulation properties achieved by the cavity, generally filled with argon, provided between the two sheets of glass of double glazings. Second, the coatings may act on the solar radiation and/or infrared radiation, based on functional layers of silver that cannot be provided on an exterior face of the glazing. Their resistance to environmental conditions would not make them sufficiently durable. They therefore must be positioned as face 2 or 3. However, it is found that if a low emissivity layer is in contact with the lamination interlayer, its low emissivity properties no longer have an impact on the heat conduction of the glazing.

Document WO 2006/108980 A2 describes laminated glazings with a functional coating provided on face 2, comprising two silver layers interposed between dielectric coatings. The glass sheets used are of tinted glass. The light transmissions obtained are respectively 9.6 and 24.8%, or lower than the target desired in the present invention. The solar factor (TE+qi), which adds the quantity of heat transmitted and reemitted, is not taken into account.

Document EP 1 060 876 A2 describes laminated glazings with a functional coating provided on face 2 and a low E coating on face 4. The light transmission obtained is 31%. 69% of visible radiation is reflected, or depending on the case, absorbed by the thermal layer, the low-E layer and the tinted PVB sheet.

The low E coating on face 4 is a fluorine doped $SnO_2$ layer deposited by pyrolysis. However, layers deposited by this method have defects compared to layers deposited by magnetron sputtering, particularly in terms of mechanics and aesthetics.

The aim of the invention is therefore to overcome the above-mentioned disadvantages by developing a laminated glazing that offers both good optical and thermal performance while guaranteeing the desired aesthetic appearance. The desired optical performance is a light transmission of between 25 and 44%, preferably between 30 and 40%, a light reflection of less than 30%, even less than 25%, and as high a selectivity as possible.

The invention relates to a laminated glazing comprising two transparent substrates separated by a lamination interlayer, each substrate comprising two main faces. The first transparent substrate is coated on one of its main faces with a functional coating that can act on solar radiation and/or infrared radiation, said coating comprising at least one metal functional layer. At least one face of the second substrate comprises a low emissive (low E) coating, said low emissive coating comprising at least one low emissive layer between two dielectric coatings.

According to a particular embodiment of the invention, the low emissive coating is provided on face 4, and the functional coating is deposited on face 2 of the laminated glazing, the faces being numbered from the exterior towards the interior of the glazing.

Advantageously, the functional coating of the first substrate comprises one or more metal functional layers, each deposited between two dielectric coatings.

In particular, the functional coating of the first substrate comprises, starting from the substrate:
a lower dielectric coating,
a metal layer,
an intermediate dielectric coating,
a metal layer,
and upper dielectric coating.

The functional coating advantageously has a Light Transmission (TL)/Energy Transmission (TE) ratio as high as possible, in particular between 1.20 and 2.50, preferably between 1.40 and 2.20 and still more preferably between 1.50 and 2.00.

Advantageously, the metal functional layer(s) of the functional coating of the first substrate are silver-based layers.

The low emissive coating of the second substrate can comprise:
a first dielectric coating,
a low emissivity layer, chosen from transparent conductive oxides and Ti, Zr or Hf nitrides,
a second dielectric coating.

In particular, the emissivity of this coating is less than 45%, preferably less than 40% and even more preferably less than 38%.

The thicknesses of the dielectric coatings, for example $SiO_2$ or $Si_3N_4$ of the coating of the second substrate, may be between 5 and 100 nm, preferably between 15 and 80 nm, and still more preferably between 20 and 75 nm.

Advantageously, one of the two coatings (functional or low emissive) comprises an absorbing layer. According to this embodiment, the functional layer can act on the solar radiation and/or the infrared radiation and/or the low emissive coating comprises an absorbing layer. The absorbing layer absorbs the solar radiation in the visible part of the spectrum.

The thickness of this absorbing layer may be between 2 and 100 nm, preferably between 4 and 50 nm and even more preferably between 5 and 25 nm.

The glazing according to the invention has a light transmission of between 25 and 44%, preferably of between 30 and 40%.

All the light energy characteristics presented in the description are obtained according to the principles and methods described in the European standard EN 410 relating to the determination of the light and solar characteristics of the glazings used in glass for the construction industry.

Conventionally, the refractive indices are measured at a wavelength of 550 nm.

The energy transmission TE corresponds to the percentage of solar energy flow transmitted directly through the glazing.

The light characteristics are measured using the illuminant D65 at 2° perpendicular to the glazing (unless otherwise indicated):
TL corresponds to light transmission in the visible range in %,
Rext corresponds to the exterior light reflection in the visible range in %, observer on the exterior space side,
Rint corresponds to the interior light reflection in the visible range in %, observer on the interior space side,
a*T and b*T correspond to the colors in transmission a* and b* in the L*a*b* system,
a*Rext and b*Rext correspond to the colors in reflection a* and b* in the L*a*b* system, observer on the exterior space side,
a*Rint and b*Rint correspond to the colors in reflection a* and b* in the L*a*b* system, observer on the interior space side.

The functional coating and/or the low E coating are deposited by magnetic-field-assisted cathode sputtering (magnetron method). According to this advantageous embodiment, all the layers of coatings are deposited by magnetic-field-assisted cathode sputtering.

The invention also relates to the method for obtaining a glazing according to the invention, wherein the layers of coatings are deposited by magnetron cathode sputtering.

The preferred characteristics which appear in the remainder of the description are applicable both to the glazing according to the invention and, where appropriate, to the method, the use, the building or the vehicle according to the invention.

Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

In the present description, unless otherwise indicated, the expression "based on", used to characterize a material or a layer with respect to what it contains, means that the mass fraction of the constituent that it comprises is at least 50%, in particular at least 70%, preferably at least 90%.

Unless otherwise mentioned, the thicknesses mentioned in the present document, without other information, are real or geometrical physical thicknesses denoted Tp and are expressed in nanometers (and not optical thicknesses). The optical thickness To is defined as the physical thickness of the layer under consideration multiplied by its refractive index at the wavelength of 550 nm: $To=n*Tp$. As the refractive index is a dimensionless value, it may be considered that the unit of the optical thickness is that chosen for the physical thickness.

According to the invention, a dielectric coating corresponds to a sequence of layers comprising at least one dielectric layer. If a dielectric coating is composed of several dielectric layers, the optical thickness of the dielectric coating corresponds to the sum of the optical thicknesses of the different dielectric layers constituting the dielectric coating.

In particular, the substrates are made of glass, particularly soda-lime-silica, or of a polymer organic material, preferably clear glass.

According to the invention, an absorbing layer that absorbs solar radiation in the visible part of the spectrum is a layer that absorbs certain wavelengths in the visible range. The optical index of an absorbing layer can be broken down into an actual part and an imaginary part. The actual part, n, corresponds to the refractive index. The imaginary part or attenuation factor k is related to the absorption of light by the layer.

According to the invention:
light reflection corresponds to the reflection of solar radiation in the visible part of the spectrum,
light transmission corresponds to the transmission of solar radiation in the visible part of the spectrum,
light absorption corresponds to the absorption of solar radiation in the visible part of the spectrum.

In particular, the absorbing layer is chosen from:
layers based on one or more metals and/or metalloids,
nitride layers of one or more metals and/or metalloids,
oxynitride layers of one or more metals and/or metalloids, elements chosen from among palladium, niobium, tungsten, iron particularly in the form of stainless steel, titanium, chromium, molybdenum, zirconium, nickel, tantalum, zinc, tin, silicon and hafnium.

The absorbing layer can be essentially in the form of elemental metal or metalloid. According to the invention, a material in elemental form means that this material is not deliberately combined with or bound to another element such as oxygen, nitrogen or carbon. This means for example that this material is not in the form of an oxide, nitride, carbide.

Although essentially in elemental form, the metal or metalloid can have traces of nitriding due to the deposit atmosphere polluted by nitrogen from the neighboring deposit zones. The absorbing layer may be a layer of metal or a metalloid chosen from among silicon, palladium, niobium, tungsten, stainless steel, titanium, chromium, molybdenum, zirconium, nickel, tantalum, zinc, alloys of these elements such as NiCr, NiCrW, WTa, WCr, NbZr, TaNiV, CrZr and NbCr.

The absorbing layer may be a nitride or a sub-nitride, that is a substoichiometric nitride with respect to nitrogen. Preferably, the absorbing layer is a nitride layer chosen from among SnZnN, TiN, NiCrWN, NiVN, TaN, CrN, ZrN, CrZrN, TiAlN, TiZrN, WN, SiZrN and SiNiCrN.

According to preferred embodiments, the absorbing layer is chosen from among a nickel and/or chrome nitride layer, a titanium nitride layer, a niobium nitride layer or a layer based on silicon.

The layer based on nickel and chrome nitride has, by increasing order preferably, a ratio by weight of nickel to chrome between 90/10 and 70/30, preferably a ratio of 80/20.

The thickness of the absorbent layer must be adapted, in particular based on the more or less absorbent nature of the material selected. It is therefore sensible to multiply the value of the geometric thickness by a value indicative of the absorbent nature of the material. Just as it is possible to define the optical thickness of a layer from the product of its geometric thickness by its (actual) optical index n; it is possible to define an "effective absorption thickness" using the following equation, where $t_{abs.\ effective}$ is the effective absorption thickness, $t_{geo}$ is the geometric thickness, n is the actual part of the optical index and k is the imaginary part of the optical index:

$$t_{abs\cdot effective}=2\times t_{geo} n\times k$$

In particular, the effective absorption thickness is between 5 and 1000 nm, preferably between 25 and 500 nm and even more preferably between 50 and 200 nm.

The effect of the absorbing nature of the layer is that this layer necessarily reduces the light transmission of the material or of the glazing of which it is comprised. To attenuate this effect, it is possible to add to the absorbing layer dielectric coatings comprising dielectric layers the materials and thicknesses whereof are judiciously selected. For example, the absorbing layer may be arranged between two dielectric coatings comprising dielectric layers with high and low refractive indices, making it possible to a certain degree to modulate the light transmission and absorption.

These dielectric coatings also make it possible to protect the absorbing layer.

The absorbing layer may form part of the functional coating. In this case, the functional coating of the first substrate may comprise an absorbing layer. In particular, the functional coating of the first substrate may comprise, starting from the substrate:
a lower dielectric coating,
a metallic functional layer,
an intermediate dielectric coating, comprising an absorbing layer
a metallic functional layer,
an upper dielectric coating.

According to an advantageous embodiment, when the functional coating of the first substrate comprises an absorbing layer:
the low emissive coating of the second substrate comprises a transparent conductive layer, and/or
the low emissive coating of the second substrate does not comprise an absorbing layer.

However, there is a possibility of providing an absorbing layer both in the functional coating of the first substrate and in the low emissive coating of the second substrate.

The absorbing layer may form part of the low emissive (or low E) coating. In this case, the low emissive coating of the second substrate may comprise an absorbing layer.

According to one embodiment, the absorbing layer may be a different layer from the low emissive layer.

According to another embodiment, the absorbing layer and the low emissive layer are one and the same. This means that the low emissive layer is also an absorbing layer. For examples, this is particularly the case of layers based on titanium nitride.

The low E coating may comprise one or more dielectric coatings and an absorbing layer, particularly low emissive.

The low E coating may comprise, starting from the substrate:
a lower dielectric coating,
an absorbing layer, particularly low emissive,
an upper dielectric coating.

The low E coating may comprise, starting from the substrate:
a lower dielectric coating,
an absorbing layer, particularly low emissive,
an intermediate dielectric coating,
an absorbing layer, particularly low emissive,
an upper dielectric coating.

According to one embodiment, when the low emissive coating of the second substrate comprises an absorbing layer, the functional coating of the first substrate does not comprise an absorbing layer.

In order to obtain a glazing falling within a certain range of light transmission, a functional coating is chosen falling within a range of light transmission to which the adapted low E coating is added.

The functional coating may comprise one or more metal functional layers, preferably based on silver, each arranged between two dielectric coatings. The functional coating may in particular comprise one, two, three or four metal functional layers. According to these embodiments:
- the functional coating comprises at least one silver-based functional metal layer, or
- the functional coating comprises at least two silver-based functional metal layers, or
- the functional coating comprises at least three silver-based functional metal layers.

The silver-based functional metal layers comprise at least 95.0%, preferably at least 96.5% and better still at least 98.0% by weight of silver, relative to the weight of the functional layer. Preferably, a silver-based functional metal layer comprises less than 1.0% by weight of metals other than silver, relative to the weight of the silver-based functional metal layer.

Preferably, the thicknesses of the functional metal layers are substantially identical.

The stack may further comprise at least one blocking layer located in contact with a functional metal layer.

The blocking layers conventionally have the role of protecting the functional layers from possible damage during the deposition of the upper antireflective coating and during a possible high-temperature heat treatment of the annealing, bending and/or tempering type.

The blocking layers are chosen from metal layers based on a metal or on a metal alloy, metal nitride layers, metal oxide layers and metal oxynitride layers of one or more elements chosen from titanium, nickel, chromium and niobium, such as a layer of Ti, TiN, TiOx, Nb, NbN, Ni, NiN, Cr, CrN, NiCr or NiCrN. When these blocking layers are deposited in the metal, nitride or oxynitride form, these layers can undergo a partial or complete oxidation according to their thickness and the nature of the layers which surround them, for example, during the deposition of the following layer or by oxidation in contact with the underlying layer.

According to advantageous embodiments of the invention, the blocking layer or layers satisfy one or more of the following conditions:
- each functional metal layer is in contact with at least one blocking layer chosen from a blocking underlayer and a blocking overlayer, and/or
- each functional metal layer is in contact with a blocking overlayer, and/or
- the thickness of each blocking layer is at least 0.1 nm, preferably comprised between 0.2 and 2.0 nm.

According to the invention, the blocking layers are considered as not forming part of a dielectric coating. This means that their thickness is not taken into account in calculating the optical thickness of the dielectric coating located in contact therewith.

"Dielectric layer" within the meaning of the present invention should be understood as meaning that, from the perspective of its nature, the material is "nonmetallic", that is, is not a metal. In the context of the invention, this term denotes a material exhibiting an n/k ratio over the entire wavelength range of the visible region (from 380 nm to 780 nm) which is equal to or greater than 5.

The dielectric layers of the coatings exhibit the following characteristics, alone or in combination:
- they are deposited by magnetic-field-assisted cathode sputtering,
- they are chosen from oxides or nitrides of one or more elements chosen from titanium, silicon, aluminum, zirconium, tin and zinc,
- they have a thickness of greater than 2 nm, preferably between 4 and 100 nm.

According to advantageous embodiments of the invention, the dielectric coatings of the functional coatings satisfy one or more of the following conditions:
- the dielectric layers may be based on an oxide or on a nitride of one or more elements chosen from silicon, zirconium, titanium, aluminum, tin, zinc, and/or
- at least one dielectric coating comprises at least one dielectric layer having a barrier function, and/or
- each dielectric coating comprises at least one dielectric layer having a barrier function, and/or
- the dielectric layers having a barrier function are based on compounds of silicon and/or aluminum chosen from oxides, such as $SiO_2$ and $Al_2O_3$, silicon nitrides $Si_3N_4$ and AlN, and oxynitrides $SiO_xN_y$ and $AlO_xN_y$, based on zinc and tin oxide, or based on titanium oxide,
- the dielectric layers having a barrier function are based on compounds of silicon and/or aluminum optionally comprise at least one other element, such as aluminum, hafnium and zirconium, and/or
- at least one dielectric coating comprises at least one dielectric layer having a stabilizing function, and/or
- each dielectric coating comprises at least one dielectric layer having a stabilizing function, and/or
- the dielectric layers having a stabilizing function are preferably based on an oxide chosen from zinc oxide, tin oxide, zirconium oxide or a mixture of at least two thereof, and/or
- the dielectric layers having a stabilizing function are preferably based on crystalline oxide, in particular based on zinc oxide, optionally doped using at least one other element, such as aluminum, and/or
- each functional layer is above a dielectric coating, the upper layer of which is a dielectric layer having a stabilizing function, preferably based on zinc oxide, and/or below a dielectric coating, the lower layer of which is a dielectric layer having a stabilizing function, preferably based on zinc oxide.

When the low E coating includes an absorbing layer (with TiN for example), each dielectric coating only consists of one or more dielectric layers. Preferably, there is no absorbing layer in the dielectric coatings, in order not to further reduce the light transmission.

The thickness of the absorbing layer, in the case of a TiN type layer, may be comprised of between 10 and 60 nm, preferably between 15 and 40 nm.

When the low E coating does not include an absorbing layer (example with ITO), one of the dielectric coatings of the functional coating may comprise an absorbing layer. In this case, preferably the intermediate dielectric coating comprises an absorbing layer. Optionally, the lower dielectric coating comprises an absorbing layer.

When the absorbing layer is of the NbN type, the thickness thereof may be between 3 and 15 nm, preferably between 4 and 10 nm.

When the dielectric coating of a functional coating comprises an absorbing layer, for which the refractive index at 550 nm comprises an imaginary part of the non-zero (or non-negligible) dielectric function, the thickness of this layer is not taken into account in calculating the optical thickness of the dielectric coating.

The dielectric layers may have a barrier function. Dielectric layers having a barrier function (hereinafter barrier layer) is understood to mean a layer made of a material capable of forming a barrier to the diffusion of oxygen and water at high temperatures, originating from the ambient atmosphere or from the transparent substrate, toward the functional layer. Such dielectric layers are chosen among the layers:

- based on silicon and/or aluminum compounds chosen from oxides such as $SiO_2$ and $Al_2O_3$, nitrides, such as silicon nitrides $Si_3N_4$ and aluminum nitrides AlN, and oxynitrides $SiO_xN_y$, $AlO_xN_y$ optionally doped using at least one other element,
- based on zinc and tin oxide,
- based on titanium oxide.

Preferably, each coating comprises at least one dielectric layer consisting of:
- an aluminum and or silicon nitride or oxynitride, or
- a mixed zinc and tin oxide, or
- a titanium oxide.

These dielectric layers have a thickness:
- of less than or equal to 40 nm, of less than or equal to 30 nm or of less than or equal to 25 nm, and/or
- of greater than or equal to 5 nm, of greater than or equal to 10 nm or of greater than or equal to 15 nm.

The functional coatings of the invention may comprise dielectric layers having a stabilizing function. Within the meaning of the invention, "stabilizing" means that the nature of the layer is selected so as to stabilize the interface between the functional layer and this layer. This stabilization results in the strengthening of the adhesion of the functional layer to the layers that surround it, and in fact will oppose the migration of its constituent material.

The dielectric layer or layers having a stabilizing function can be directly in contact with a functional layer or separated by a blocking layer.

Preferably, the final dielectric layer of each dielectric coating located below a functional layer is a dielectric layer having a stabilizing function.

It is also advantageous to have a layer having a stabilizing function, for example based on zinc oxide, above a functional layer in order to increase the adhesion thereof and to optimally oppose the diffusion on the side of the stack opposite the substrate.

The dielectric layer or layers having a stabilizing function can thus be found above and/or below at least one functional layer or each functional layer, either directly in contact with it or separated by a blocking layer.

Advantageously, each dielectric layer having a barrier function is separated from a functional layer by at least one dielectric layer having a stabilizing function.

The zinc oxide layer may optionally be doped by means of at least one other element, such as aluminum. The zinc oxide is crystallized. The layer based on zinc oxide comprises, in increasing order preferably, at least 90.0%, at least 92%, at least 95%, at least 98.0% by mass of zinc relative to the mass of elements other than oxygen in the zinc oxide-based layer.

Preferably, the dielectric coatings of the functional coatings comprise a dielectric layer based on zinc oxide located beneath and directly in contact with the silver-based metal layer.

The zinc oxide layers have, in increasing order preferably, a thickness of:
- at least 3.0 nm, at least 4.0 nm, and/or
- at most 25 nm, at most 10 nm, at most 8.0 nm.

The functional coating may optionally comprise an upper protective layer. The upper protective layer is preferably the last layer of the stack, that is, the layer furthest from the substrate coated with the stack. These upper protective layers are regarded as included in the last dielectric coating. These layers generally have a thickness comprised between 2 and 10 nm, preferably 2 and 5 nm.

The protective layer may be selected from a layer of titanium, zirconium, hafnium, zinc and/or tin, this or these metals being in the metal, oxide or nitride form. Advantageously, the protective layer is a layer of titanium oxide, a layer of tin zinc oxide or a layer based on titanium zirconium oxide.

A particularly advantageous embodiment of the functional coating, defined starting from the transparent substrate, comprising:
- a first dielectric coating comprising at least one layer having a barrier function and one dielectric layer having a stabilizing function,
- optionally a blocking layer,
- a first functional layer,
- optionally a blocking layer,
- a second dielectric coating comprising at least one dielectric layer having a stabilizing function and a dielectric layer having a barrier function,
- optionally a protective layer.

According to another particularly advantageous embodiment of the functional coating, it comprises:
- a first dielectric coating comprising at least one layer having a barrier function and one dielectric layer having a stabilizing function,
- optionally a blocking layer,
- a first functional layer,
- optionally a blocking layer,
- a second dielectric coating comprising at least one lower dielectric layer having a stabilizing function, one layer having a barrier function and one upper dielectric layer having a stabilizing function,
- optionally a blocking layer,
- a second functional layer,
- optionally a blocking layer,
- a third dielectric coating comprising at least one dielectric layer having a stabilizing function, one layer having a barrier function,
- optionally a protective layer.

According to another particularly advantageous embodiment, the stack of the functional coating defined starting from the transparent substrate, comprises:
- a first dielectric coating comprising at least one layer having a barrier function and one dielectric layer having a stabilizing function,
- optionally a blocking layer,
- a first functional layer,
- optionally a blocking layer,
- a second dielectric coating comprising at least one lower dielectric layer having a stabilizing function, one layer having a barrier function and one upper dielectric layer having a stabilizing function,
- optionally a blocking layer,
- a second functional layer,
- optionally a blocking layer,
- a third dielectric coating comprising at least one lower dielectric layer having a stabilizing function, one layer having a barrier function and one upper dielectric layer having a stabilizing function,
- optionally a blocking layer,
- a third functional layer, optionally a blocking layer,
a fourth dielectric coating comprising at least one dielectric layer having a stabilizing function, a layer having a barrier function,
optionally a protective layer.

The transparent substrates according to the invention are preferably made of a rigid inorganic material, such as made of glass, or are organic, based on polymers (or made of polymer).

The organic transparent substrates according to the invention can also be made of polymer, and are rigid or flexible. Examples of polymers which are suitable according to the invention comprise, in particular:
polyethylene,
polyesters, such as polyethylene terephthalate (PET), polybutylene terephthalate (PBT) or polyethylene naphthalate (PEN);
polyacrylates, such as polymethyl methacrylate (PMMA);
polycarbonates;
polyurethanes;
polyamides;
polyimides;
fluorinated polymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE), fluorinated ethylene-propylene copolymers (FEP);
photocrosslinkable and/or photopolymerizable resins, such as thiolene, polyurethane, urethane-acrylate, polyester-acrylate resins, and
polythiourethanes.

The substrate is preferably a sheet of glass.

The substrate is preferably transparent, colorless (it is then a clear or extra-clear glass) or colored, for example blue, gray or bronze. The glass is preferably of soda-lime-silica type but it can also be a glass of borosilicate or aluminoborosilicate type.

The light transmission (TL) of the substrates of ordinary soda-lime glass type, without stack, is greater than 89%, preferably of 90%.

Ordinary clear glass from 4 to 6 mm thick has the following light characteristics:
light transmission between 89 and 91.5%,
light reflection between 7 and 9.5%,
light absorption between 0.3 and 3%.

According to a preferred embodiment, the substrate is made of glass, particularly soda-lime-silica glass, or of polymer organic material.

The substrate advantageously has at least one dimension greater than or equal to 1 m, indeed even 2 m and even 3 m. The thickness of the substrate generally varies between 0.5 mm and 19 mm, preferably between 0.7 and 9 mm, in particular between 2 and 8 mm, indeed even between 4 and 6 mm. The substrate may be flat or curved, indeed even flexible.

The coated substrates may undergo a high-temperature heat treatment, such as an annealing, for example by a flash annealing, such as a laser or flame annealing, a tempering and/or a bending. The temperature of the heat treatment is greater than 400° C., preferably greater than 450° C. and better still greater than 500° C. The coated substrate of the functional coating can thus be bent and/or tempered.

According to advantageous embodiments, the laminated glazing according to the invention allows the following performances to be achieved:

a solar factor g of less than or equal to 40%, preferably of less than 30%, indeed even of less than or equal to 29%; and/or
a light transmission between 25 and 44%, preferably between 30% and 40%, still more preferably between 32 and 38%; and/or
a selectivity of at least 1.05, preferably at least 1.10 and even more preferably at least 1.15; and/or
a light reflection on the external side of less than or equal to 30%, preferably less than or equal to 25%, and even more preferably less than 20%; and/or
a light reflection, interior side, of less than or equal to 30%, preferably of less than or equal to 25%; and/or
exterior reflection values of a* and b*, by increasing order preferably, between −10 and +5, between −8 and +1, between −6 and 0; and/or
interior reflection values of a* and b*, by increasing order preferably, between −5 and +8, between −3 and +6, between −1 and +3; and/or
transmission values of a* and b*, by increasing order preferably, −10 and +5, between −8 and +1, between −6 and 0.

The details and advantageous characteristics of the invention emerge from the following nonlimiting examples.

EXAMPLES

I. Functional Coatings

Functional coatings (RF1, RF2) are deposited on substrates made of clear soda-lime glass with a thickness of 4 mm.

Table 1 below summarizes the characteristics related to the thicknesses of the different layers constituting the functional coatings. In the laminated glazing, the coated face will constitute the interior face of the first substrate, i.e., face 2 of the laminated glazing.

The thicknesses of the layers are physical thicknesses, and are expressed in nm.

TABLE 1

| Nature | | RF1 | RF2 |
| --- | --- | --- | --- |
| RDS | $Si_3N_4$ | 32 | 40 |
|  | ZnO | 6 | 4 |
| blocker | NiCr | 0.2 | 1 |
| CF | Ag | 7 | 10 |
| RDInt b | ZnO | 6 | 4 |
|  | $Si_3N_4$ |  | 46 |
| CA | NbN | — | 6 |
| RDInt a | $Si_3N_4$ | 72 | 32 |
|  | ZnO | 6 | 4 |
| blocker | NiCr | 0.2 | 1 |
| CF | Ag | 8 | 8 |
| RDI | ZnO | 6 | 4 |
|  | $Si_3N_4$ | 18 | 24 |
| SUB | Glass | 4 | 4 |

RDS = upper dielectric coating;
CA = absorbing layer;
CF = functional layer;
RDInt = Intermediate dielectric coating;
RDI = Lower dielectric coating;
SUB = Substrate Nature of the Layers The functional metal layers (CF) are layers based on silver (Ag). The blocking layers are metallic layers made of nickel-chromium alloy (NiCr). The dielectric coatings of the functional coatings comprise barrier layers and stabilizing layers. The barrier layers are based on silicon nitride, doped with aluminum ($Si_3N_4$: A1) or based on a mixed zinc and tin oxide (SnZnOx). The stabilizing layers are made of zinc oxide (ZnO).

When the absorbing layer is inserted into the functional coating, it is preferably based on nitride, particularly NbN.

The layers are deposited by sputtering (called "magnetron cathode" sputtering).

II. Low E Coatings

Low E coatings are deposited on clear soda-lime glass substrates having a thickness of 4 mm. The coated face will constitute the exterior face of the second substrate, i.e., face 4 of the laminated glazing.

When the functional coating is the RF1 stack above, the low E coating starting from the substrate, is: $Si_3N_4$ (25 nm)/TiN (23 nm)/$Si_3N_4$ (25 nm)

It has an emissivity of 35%.

When the functional coating is the RF2 stack above, the low E coating starting from the substrate is: $Si_3N_4$ (25 nm)/ITO (95 nm)/$SiO_2$ (72 nm)

It has an emissivity of 20%.

III. Configuration of the Laminated Glazings

A first coated substrate of a functional coating (RF) on face 2 and a second coated substrate of a low E coating on face 4 have been assembled in the form of laminated glazing, by means of a traditional laminating interlayer.

The laminated glazings therefore have a typical structure:
First substrate/RF/laminating interlayer/second substrate/Low E

V. "Solar Control" and Colorimetry Performance

Table 2 below lists the main optical characteristics of the laminated glazings obtained.

TABLE 2

|  | Functional R |  | R Low E |  |  |  |  |  |  |  |  |  |  |  |  |  |
|---|---|---|---|---|---|---|---|---|---|---|---|---|---|---|---|---|
| Material | Position | Nature | Position | Nature | TL % | a*T | b*T | Rext % | a*Rext | b*Rext | Rint % | a*int | b*int | g % | TE | RFext | S |
| Ref. 1 | Face 2 | RF 1 |  | none | 69 | −2.4 | 0.2 | 13 | −1.3 | −0.7 | 9 | −3.1 | 0.6 | 50 | 43 | 28 | 1.38 |
| Ref. 2 | Face 2 | RF 2 |  | none | 35 | −3.3 | 0.2 | 15 | −1.4 | −3.4 | 15 | 0.0 | 1.1 | 34 | 22 | 26 | 1.01 |
| Inv. 1 | Face 2 | RF 1 | Face 4 | TIN | 35 | −4.1 | −1.5 | 15 | −1.7 | −5.8 | 16 | 0.6 | 2.1 | 28 | 19 | 29 | 1.23 |
| Inv. 2 | Face 2 | RF 2 | Face 4 | ITO | 35 | −3.0 | 1.0 | 15 | −1.5 | −4.0 | 13 | −1.7 | −2.7 | 30 | 22 | 26 | 1.17 |

Comparing Inv.1 with Ref.1 and Ref.2, it can be seen that, thanks to a high TL functional coating and an absorbing low E layer, a laminated glazing is obtained having a light transmission within the target of 30 to 40%, a low interior and exterior light reflection, respectively 16 and 15%, and improved selectivity compared to Ref. 2 that has the same TL.

The TE was able to be reduced relative to Ref. 1 and Ref. 2.

Comparing Inv. 2 with Ref. 1 and 2, it can be seen that, thanks to a transparent conductive coating and a low TL functional coating, comprising an absorbing layer, a laminated glazing is obtained having a light transmission within the target of 30 to 40%, a low interior and exterior reflection, respectively 13 and 15%, and improved selectivity compared to Ref. 2 that has the same TL.

The invention is not restricted to the use of functional coatings with two silver layers.

The invention claimed is:

1. A laminated glazing comprising first and second transparent substrates which are separated by a lamination interlayer, each of the first and second transparent substrates comprising two main faces, the first transparent substrate being coated on one of its two main faces with a functional coating capable of acting on the solar radiation and/or infrared radiation, said functional coating comprising one or more metal functional silver-based layers, each deposited between two dielectric coatings,
  wherein at least one main face of the second substrate comprises a low emissive coating, said low emissive coating comprising at least one low emissive layer between two dielectric coatings, the low emissive layer being a layer of a transparent conductive oxide,
  the thicknesses of the dielectric coatings of the coating of the second substrate are between 5 and 100 nm,
  the functional coating and the low E coating being deposited by magnetic-field-assisted cathode sputtering,
  wherein at least one of the functional and low emissive coatings comprises an absorbing layer having a thickness between 4 and 100 nm and selected from one or more of:
    at least one layer based on one or more metals and/or one or more metalloids, said one or more metals and/or one or more metalloids being chosen from among palladium, niobium, tungsten, iron optionally in the form of stainless steel, titanium, chromium, molybdenum, zirconium, nickel, tantalum, zinc, tin, and hafnium,
    at least one nitride layer of said one or more of metals and/or said one or more metalloids,
    at least one oxynitride layer of said one or more metals and/or said one or more metalloids,
  wherein, when the absorbing layer is comprised in the functional coating, the absorbing layer is out of contact with the one or more metal functional silver-based layers,
  wherein the laminated glazing has a light transmission of between 25 and 44%, a light reflection on an external side of the laminated glazing being less than or equal to 25% and a light reflection on an interior side of the laminated glazing being less than or equal to 25%.

2. The laminated glazing according to claim 1, wherein the low emissive coating is provided on face 4, and the functional coating is deposited on face 2 of the laminated glazing, wherein faces of the glazing are numbered from the exterior towards the interior of the glazing.

3. The laminated glazing according to claim 1, wherein the functional coating of the first substrate comprises, starting from the substrate:
  a lower dielectric coating,
  a metallic functional layer,
  an intermediate dielectric coating,
  a metallic functional layer,
  an upper dielectric coating.

4. The laminated glazing according to claim 1, wherein the functional coating of the first substrate comprises the absorbing layer.

5. The laminated glazing according to claim 4, wherein the functional coating of the first substrate comprises, starting from the substrate:
- a lower dielectric coating,
- a metallic functional layer,
- an intermediate dielectric coating,
- a metallic functional layer,
- an upper dielectric coating,
- the intermediate dielectric coating comprising the absorbing layer.

6. The laminated glazing according to claim 4, wherein the first and second substrates are made of glass or of polymer organic material.

7. The laminated glazing according to claim 6, wherein the first and second substrates are made of clear glass.

8. The laminated glazing according to claim 6, wherein the glass is soda-lime-silica glass.

9. The laminated glazing according to claim 1, wherein the dielectric coatings of the low emissivity coating of the second substrate, have thicknesses between 15 and 80 nm.

10. The laminated glazing according to claim 1, wherein the thickness of the absorbing layer is between 4 and 50 nm.

11. The laminated glazing according to claim 1, wherein the laminated glazing has a light transmission of between 30 and 40%.

12. The laminated glazing according to claim 11, wherein the laminated glazing has a light transmission of between 32 and 40%.

13. The laminated glazing according to claim 12, wherein the laminated glazing has a light transmission of between 33 and 40%.

14. The laminated glazing according to claim 1, wherein the absorbing layer is selected from one or more of:
- at least one layer based on one or more metals and/or one or more metalloids, which one or more metals and/or one or more metalloids are chosen from among niobium, tungsten, titanium, chromium, zirconium and nickel,
- at least one nitride layer of said one or more of metals and/or said one or more metalloids.

15. A method for manufacturing a glazing according to claim 1, wherein the functional and low emissive coatings are deposited by magnetron cathode sputtering.

* * * * *